United States Patent
Li et al.

(10) Patent No.: US 7,346,279 B1
(45) Date of Patent: Mar. 18, 2008

(54) OPTICAL TRANSCEIVER USING HETERODYNE DETECTION AND A TRANSMITTED REFERENCE CLOCK

(75) Inventors: Ji Li, San Jose, CA (US); Laurence J. Newell, Mercer Island, WA (US); Tin Vo, San Jose, CA (US); Ting K. Yee, Foster City, CA (US); Peter H. Chang, San Jose, CA (US); Robert K. McElheny, Sunnyvale, CA (US)

(73) Assignee: Forster Energy LLC, Las Vegas, NV (US)

( * ) Notice: Subject to any disclaimer, the term of this patent is extended or adjusted under 35 U.S.C. 154(b) by 642 days.

(21) Appl. No.: 10/107,085

(22) Filed: Mar. 25, 2002
(Under 37 CFR 1.47)

(51) Int. Cl.
*H04B 10/08* (2006.01)
*H04B 10/00* (2006.01)

(52) U.S. Cl. .......................... 398/32; 398/155
(58) Field of Classification Search ............ 398/203, 398/204, 183, 155, 32, 185–186, 163, 211
See application file for complete search history.

(56) References Cited

U.S. PATENT DOCUMENTS

| | | | |
|---|---|---|---|
| 4,403,194 A * | 9/1983 | Talbot | 329/349 |
| 5,546,190 A * | 8/1996 | Hill et al. | 398/76 |
| 6,529,303 B1 * | 3/2003 | Rowan et al. | 398/82 |
| 6,658,213 B2 * | 12/2003 | Hayashi et al. | 398/95 |
| 6,658,216 B1 * | 12/2003 | Iida et al. | 398/187 |

* cited by examiner

*Primary Examiner*—Jason Chan
*Assistant Examiner*—Quan-Zhen Wang

(57) ABSTRACT

A heterodyne communication system uses coherent data modulation that is resistant to phase noise. In particular, a pilot tone and reference clock signal are transmitted along with the modulated data to form the basis of an electrical demodulation local oscillator at the receiver. The pilot tone and/or reference clock signal carry phase noise which is correlated with the phase noise in the data signal. At the receiver, the local oscillator is generated from the pilot tone and reference clock signal in a manner so that the local oscillator also has phase noise which is correlated with the phase noise in the data signal. Thus, the two noise components can be used to cancel each other during demodulation of the data signal using the local oscillator.

62 Claims, 10 Drawing Sheets

OPTICAL TRANSCEIVER USING HETERODYNE DETECTION AND A TRANSMITTED REFERENCE CLOCK

BACKGROUND OF THE INVENTION

1. Field of the Invention

This invention relates generally to optical fiber communications and, more particularly, to a reduction in the effects of phase variations introduced by the optical carrier.

2. Description of the Related Art

As the result of continuous advances in technology, particularly in the area of networking, there is an increasing demand for communications bandwidth. For example, the growth of the Internet, home office usage, e-commerce and other broadband services is creating an ever-increasing demand for communications bandwidth. Upcoming widespread deployment of new bandwidth-intensive services, such as xDSL, will only further intensify this demand. Moreover, as data-intensive applications proliferate and data rates for local area networks increase, businesses will also demand higher speed connectivity to the wide area network (WAN) in order to support virtual private networks and high-speed Internet access. Enterprises that currently access the WAN through T1 circuits will require DS-3, OC-3, or equivalent connections in the near future. As a result, the networking infrastructure will be required to accommodate greatly increased traffic.

Optical fiber is a transmission medium that is well-suited to meet this increasing demand. Optical fiber has an inherent bandwidth which is much greater than metal-based conductors, such as twisted pair or coaxial cable. There is a significant installed base of optical fibers and protocols such as SONET have been developed for the transmission of data over optical fibers. Typical communications systems based on optical fibers include a transmitter, an optical fiber, and a receiver.

The transmitter modulates the data, converts the data into an optical form and transmits the resulting optical signal across the optical fiber to the receiver. In a common design, the transmitter includes a laser source coupled to an external modulator. The laser source produces an optical carrier, which is modulated with the data by an external modulator. This results in an optical data signal which carries the data to be transported across the optical fiber.

On the other end of the optical fiber, the receiver recovers the original data from the optical data signal transported across the optical fiber. Recent advances in receiver technology are leading to more widespread adoption of receivers based on heterodyne detection. A heterodyne receiver typically includes a local laser source. The local laser source generates an optical local oscillator which is mixed with the incoming optical data signal as part of the heterodyne detection process.

To increase the efficiency of data transmission, many fiber communications systems utilize a coherent modulation scheme before transmitting the data on the optical data signal. A coherent modulation scheme takes advantage of phase information in a data signal.

Coherent modulation schemes are used in modulating data onto a transmitted optical signal and demodulating a received signal to obtain the transmitted data. For coherent modulation, an absolute phase reference is present at the transmitter and receiver to modulate and demodulate the transmitted signal, respectively. The phase references at the transmitter and receiver are said to be phase coherent when they are locked in phase.

A coherent modulation scheme utilizes phase information in representing data in a signal. Relative phases errors in the absolute phase references generally results in errors in the transmitted data. Example coherent modulation schemes include Quadrature Amplitude Modulation (QAM), Phase Shift Keying (PSK) and Quadrature Phase Shift Keying (QPSK).

An electrical signal generated by coherent modulation may be upshifted to an optical carrier to generate an optical signal employing coherent modulation. This optical signal can be generated using a laser source and an amplitude modulator (e.g. an MZM) to generate coherently modulated optical subcarriers. This approach, in which coherent modulation originates in the electrical domain, contrasts with direct coherent optical modulation, in which optical signals comprising coherent modulation can be generated using a phase modulator to modulate the optical carrier directly.

Data transmitted using coherently modulated optical signals can be received using heterodyne detection. Heterodyne detection is a type of coherent optical detection, or coherent detection, that generally utilizes an optical source as a local oscillator to downshift a coherently modulated optical signal to an RF signal. The local oscillator is generally at a different center frequency than an optical carrier or subcarrier. Subsequently, the RF signal is demodulated using a coherent local oscillator at an RF frequency. Data may also be coherently demodulated directly using homodyne detection, in which the optical local oscillator is phase coherent with the transmitting laser.

One particular optical communication process utilizes coherent modulation including optical subcarrier multiplexing at the transmitter and heterodyne detection at the receiver. Throughout this process, the data signal employing coherent modulation is converted from the electrical domain, to the optical domain, and then back to the electrical domain. The integrity of the data signal relies on the fidelity of the phase information in the data signal. At each step, phase noise can be introduced into the signal. Significant sources of phase noise in a transmission system include the phase noise of the transmit laser source producing an optical carrier and the phase noise in the receive laser source producing the optical local oscillator. Other sources of phase noise include the transmit local oscillator generating the electrical signal and the receive local oscillator demodulating the received electrical signal.

Traditionally, optical communication systems have addressed the problem of added phase noise by either using a phase-stable laser, or by designing complex phase-locking circuits into the demodulator. However, phase-stable lasers are both bulky and expensive, making them impractical for commercial applications. Complex phase-locking circuits are likewise expensive and difficult to implement. Furthermore, both solutions significantly raise the cost and complexity of the system.

Therefore there is a need for a fiber optic communications system which adequately deals with phase noise, including laser phase noise, without utilizing complex phase-locking circuits or expensive lasers.

SUMMARY OF THE INVENTION

The present invention overcomes the limitations of the prior art by providing a heterodyne communication system using coherent data modulation that is resistant to phase noise, including laser phase noise, electrical phase noise, and phase noise from other sources as well. In particular, a pilot tone and reference clock signal are transmitted along with the modulated data to form the basis of an electrical demodulation local oscillator at the receiver end. The pilot tone carries phase noise that is correlated with the phase noise in the data signal. At the receiver, the local oscillator is generated from the pilot tone and reference clock signal in a manner so that the local oscillator also has phase noise that is correlated with the phase noise in the data signal. Thus, the two noise components can be used to cancel each other during demodulation of the data signal using the local oscillator.

In one implementation, a transmitter subsystem includes a pilot tone generator, a reference clock generator, a signal generator, and an optical modulator. The pilot tone generator generates a pilot tone at a pilot tone frequency. The reference clock generator generates a reference clock signal at a reference clock frequency. The signal generator combines the reference clock generator, the pilot tone and a subcarrier channel into an information signal. The subcarrier channel includes a coherently modulated data stream located at a subcarrier frequency. In one implementation, the data is modulated according to a QPSK modulation scheme. The optical modulator generates an optical signal containing the information signal. Preferably the pilot tone and subcarrier channel are derived from mutually coherent sources or from the same source.

In one embodiment, the signal generator includes a incoherent reference signal modulator. The incoherent reference signal modulator modulates the pilot tone with the reference clock signal utilizing a incoherent modulation scheme (e.g., AM modulation) to protect the resulting reference signal from phase noise. Thus, the optical signal contains the pilot tone modulated by the reference clock signal and also the subcarrier channel. In a preferred embodiment, the pilot tone is modulated using AM modulation and square-law detectors or filters recover the reference signal.

In another embodiment, the pilot tone frequency, subcarrier frequency, and reference clock frequency are chosen such that the difference between the pilot tone frequency and the subcarrier frequency is a fractional multiple of the reference clock frequency. Preferably, this fractional multiple is an integer multiple. In this way, the pilot tone can be frequency shifted to the subcarrier frequency by adding (or subtracting) a multiple of the reference clock.

In another implementation, the signal generator combines additional subcarrier channels into the information signal. Each of these additional subcarrier channels has a unique subcarrier frequency and is coherently modulated, preferably by QPSK. Preferably, each subcarrier frequency can be expressed as a multiple of the reference clock frequency plus the pilot tone frequency. The use of several unique subcarrier frequencies allow the frequency division multiplexing of several data signals while transmitting a single pilot tone and reference clock signal to guard against phase noise.

In another aspect of the invention, a receiver subsystem includes a heterodyne detector, an information signal splitter, a local oscillator generator, and a coherent demodulator. The heterodyne detector receives an optical signal and converts it into an electrical signal. The electrical signal includes a pilot tone, a reference clock signal, and a subcarrier channel. The information signal splitter divides the electrical signal into these individual components. The local oscillator generator generates an electrical local oscillator from the pilot tone and reference clock signal in a manner such that the local oscillator carries phase noise which is correlated with phase noise in the subcarrier channel. The coherent demodulator demodulates the subcarrier channel using the local oscillator, canceling the phase noise in the two signals.

In one implementation, the information signal splitter includes a data recovery section and a pilot tone recovery section. The data recovery section isolates the subcarrier channel. The pilot tone recovery section isolates the pilot tone. Each recovery section has a corresponding group delay, and care is taken to match the two group delays so that, ideally, they are equal, thus providing for cancellation of phase noise.

In another aspect of the invention, the information signal splitter includes a clock recovery section. The clock recovery section isolates the reference clock signal. Preferably, the reference clock signal is incoherently demodulated from the pilot tone in order to remove any phase noise from the reference clock signal.

In one implementation, the local oscillator generator includes a frequency multiplier and a mixer. The frequency multiplier multiplies the reference clock frequency by a fractional factor. The mixer adds or subtracts the multiplied clock from the pilot tone frequency to form the local oscillator. Preferably, the reference clock signal does not include any phase noise so that when added to the pilot tone, the local oscillator has the same phase noise as the pilot tone, and consequentially the same phase noise as the subcarrier channel.

In another embodiment, the receiver subsystem includes additional local oscillator generators, additional coherent demodulators and the information splitter includes additional data recovery paths. The information splitter recovers additional subcarrier channels located at unique subcarrier frequencies. The additional local oscillator generators generate additional local oscillators, and the additional coherent demodulators demodulate the additional subcarrier channels with respect to the additional local oscillators. Preferably each local oscillator generator generates a local oscillator for each corresponding subcarrier channel and further contains the same phase noise as the corresponding subcarrier channel.

In another aspect of the invention the coherent demodulator utilizes a QPSK demodulation scheme. The demodulator includes an I-channel mixer, a Q-channel mixer, two variable phase delays, a Costas phase discriminator loop and a Quadrature Imbalance Compensated Phase Discriminator loop. The mixers mix the local oscillator and the subcarrier channel together to recover the I and Q channels of the data. The variable phase delays work to adjust the local oscillator to accurately recover the phase information for each channel. The Costas loop adjusts the relative phase between the local oscillator and the subcarrier channel while the Quadrature Imbalance Compensated Phase Discriminator adjusts the relative phase between the I and Q channels.

Other aspects of the invention include methods relating to the devices described above.

One advantage of the present invention is that it significantly reduces the effects of phase noise in a coherently modulated optical heterodyne communications system.

BRIEF DESCRIPTION OF THE DRAWING

The invention has other advantages and features which will be more readily apparent from the following detailed description of the invention and the appended claims, when taken in conjunction with the accompanying drawing, in which:

DETAILED DESCRIPTION OF THE PREFERRED EMBODIMENTS

Figure 1:
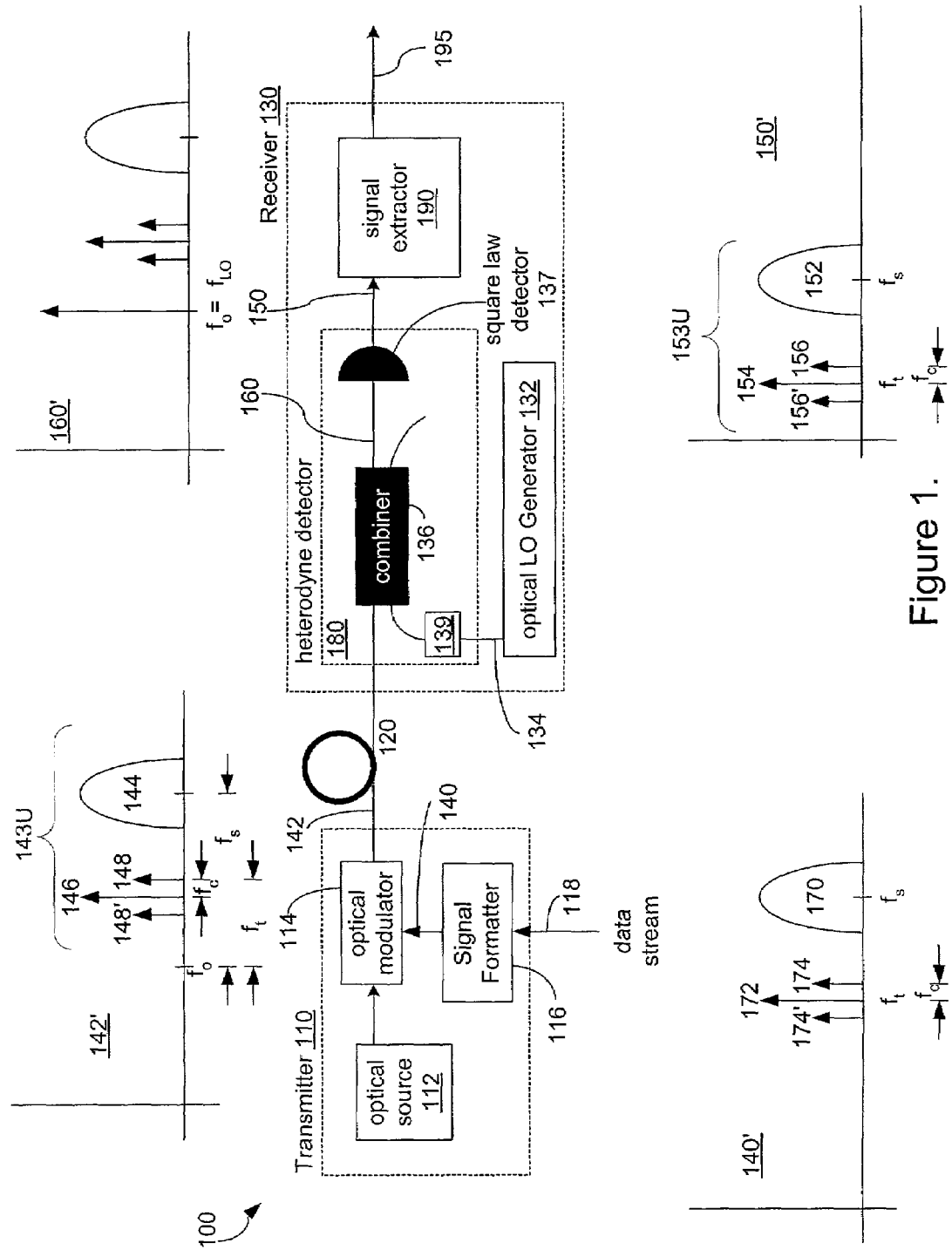
FIG. 1 is a block diagram of a fiber optic communications system using heterodyne detection.

FIG. 1 is a block diagram of a fiber optic communications system using heterodyne detection. System 100 includes a transmitter 110 coupled to a receiver 130 by optical fiber 120. System 100 is used to transmit a data stream 118 from transmitter 110 to receiver 130 via fiber 120. Transmitter 110 includes an optical source 112 coupled to an optical modulator 114, and a signal formatter 116 also coupled to optical modulator 114. Examples of optical sources 112 include solid state laser and semiconductor lasers. Example optical modulators 114 include Mach-Zender modulators (MZM), electro-optic modulators, and electro-absorptive modulators. Receiver 130 includes a heterodyne detector 180 coupled to a signal extractor 190. Receiver 130 also includes an optical local oscillator generator 132 for generating an optical local oscillator signal 134 for use in the heterodyne detector 180. Examples of optical LO generator 132 include solid state lasers and semiconductor lasers.

System 100 operates as follows. Data stream 118 typically is a digital data stream. In certain applications, data stream 118 may instead be analog. Signal formatter 116 receives data stream 118 and formats it into an information signal 140. An example of one embodiment of information signal 140 can be seen in a frequency spectrum 140'. Spectrum 140' includes a subcarrier channel 170 characterized by a subcarrier frequency $f_S$. The information carried in subcarrier channel 170 corresponds to the information carried in data stream 118. Spectrum 140' also includes a pilot tone 172 located at a frequency $f_t$ and two reference clock sidebands 174, 174' each offset from $f_t$ by a reference clock frequency $f_C$. The term "tone" as used in this description is contemplated to indicate a continuous wave signal. Spectrum 140' illustrates one possible arrangement of the elements of information signal 140. Other variations will be apparent to one skilled in the art.

Optical modulator 114 receives information signal 140 and modulates an optical carrier from optical source 112 to generate an optical data signal 142. Optical data signal 142 is characterized by an optical carrier frequency $f_O$. The frequency spectrum of one embodiment of optical data signal 142 can be seen in a spectrum 142'. Optical data signal 142 includes an upper sideband 143U and a lower sideband (not shown or transmitted in the preferred embodiment) containing identical information. Further illustration will reference upper sideband 143U, but the description is equally applicable to the lower sideband. Upper sideband 143U includes a subcarrier channel 144 offset in frequency from $f_O$ by an amount equivalent to $f_S$. Upper sideband 143U also includes a pilot tone 146 and two reference clock sidebands 148, 148'. Pilot tone 146 is located at a frequency equal to $f_O+f_t$, while reference clock sidebands 148, 148' maintain an offset of $f_C$ from pilot tone 146. Spectrum 142' illustrates only one possible arrangement of elements in optical data stream 142. Other arrangements will be apparent to one skilled in the art.

In more detail, the optical source 112 produces an optical carrier signal at the optical carrier frequency $f_O$. Many commercially practical implementations of optical source 112 also introduce a significant amount of phase noise with the optical carrier signal which is generally characterized by a linewidth. The modulator 114 receives the information signal 140 and modulates the optical carrier with the information signal 140 to generate optical data signal 142. FIG. 1 illustrates a signal using single sideband modulation resulting in upper side band 143U, however other types of modulation such as double sideband modulation may also be used. In the example of FIG. 1, the modulator 114 suppresses the optical carrier and does not produce a significant signal at the optical carrier frequency $f_O$. Transmitted pilot tone 146 replaces the optical carrier signal as an aid to signal recovery within heterodyne detector 180. This arrangement allows the system to avoid transmitting the optical carrier signal thus reducing power handling requirements in fiber 120. Single sideband modulation also increase spectral efficiency and resistance to impairments such as chromatic dispersion by reducing nonlinear optical distortion.

In a preferred embodiment, the modulator 114 includes a Mach-Zender modulator (MZM). The conventional two-arm MZM has a raised cosine transfer function. The MZM is based at one minimum point of the raised cosine transfer function. Operation at the minimum point suppresses the optical carrier and the result is an optical data signal that includes lower sideband (not shown) and upper sideband 143U, but no optical carrier signal at $f_O$. The MZM further includes an optical filter to suppress the lower sideband.

In another approach, a conventional two-arm MZM is biased at a point close to but slightly offset from the minimum point of the raised cosine transfer function. The slight offset results in some carrier being introduced into the optical signal, thus resulting in a spectrum with a reduced optical carrier. Other techniques for generating singe sideband modulation are discussed in *X-cut Lithium Niobate Optical Single Sideband Modulation*, K. Higuma et. al., ELECTRONICS LETTERS VOL 37, No. 8, Apr. 12, 2001, which is incorporated by reference in its entirety herein.

Returning to FIG. 1, the optical data signal 142 and the phase noise from optical source 112 are transmitted over fiber 120 to receiver 130. Current optical fibers have two spectral regions which are commonly used for communications: the 1.3 and 1.55 micron regions. At a wavelength of 1.3 micron, transmission of the optical signal is primarily limited by attenuation in the fiber 120. Dispersion is less of a factor. Conversely, at a wavelength of 1.55 micron, the optical signal will experience more dispersion but less attenuation. Hence, the optical signal preferably has a wavelength either in the 1.3 micron region or the 1.55 micron region and, for long distance communications systems, the 1.55 micron region is generally preferred.

At receiver 130, heterodyne detector 180 receives the incoming optical data signal 142 and also receives an optical local oscillator signal 134 at a frequency $f_{LO}$ from optical LO source 132. In FIG. 1, local oscillator signal 134 is shown at a frequency $f_{LO}$ which is equal to the carrier frequency $f_O$. However, the local oscillator signal 134 may also be located at a frequency $f_{LO}$ which is higher or lower than the carrier frequency $f_O$. The optical signal 142 and local oscillator signal 134 are combined and heterodyne detection of the combined signal effectively downshifts optical signal 142 from a carrier at frequency $f_O$ to the original frequency space of information signal 140. The resulting electrical signal 150 has spectrum 150'. Note that upper sideband 153U has been recovered and frequency downshifted compared to optical signal 142. In the preferred embodiment, sideband 153U includes a subcarrier channel 152, a pilot tone 154 and two reference clock sidebands 156, 156'. These elements correspond to the elements present in information signal 140. Electrical signal 150 also contains the phase noise generated by optical source 112.

Signal extractor 190 receives electrical signal 150 from heterodyne detector 180, and removes the formatting applied to data stream 118 by signal formatter 116. Signal extractor 190 then outputs a recovered data stream 195 which carries the same information and format as data stream 118.

Figure 2:
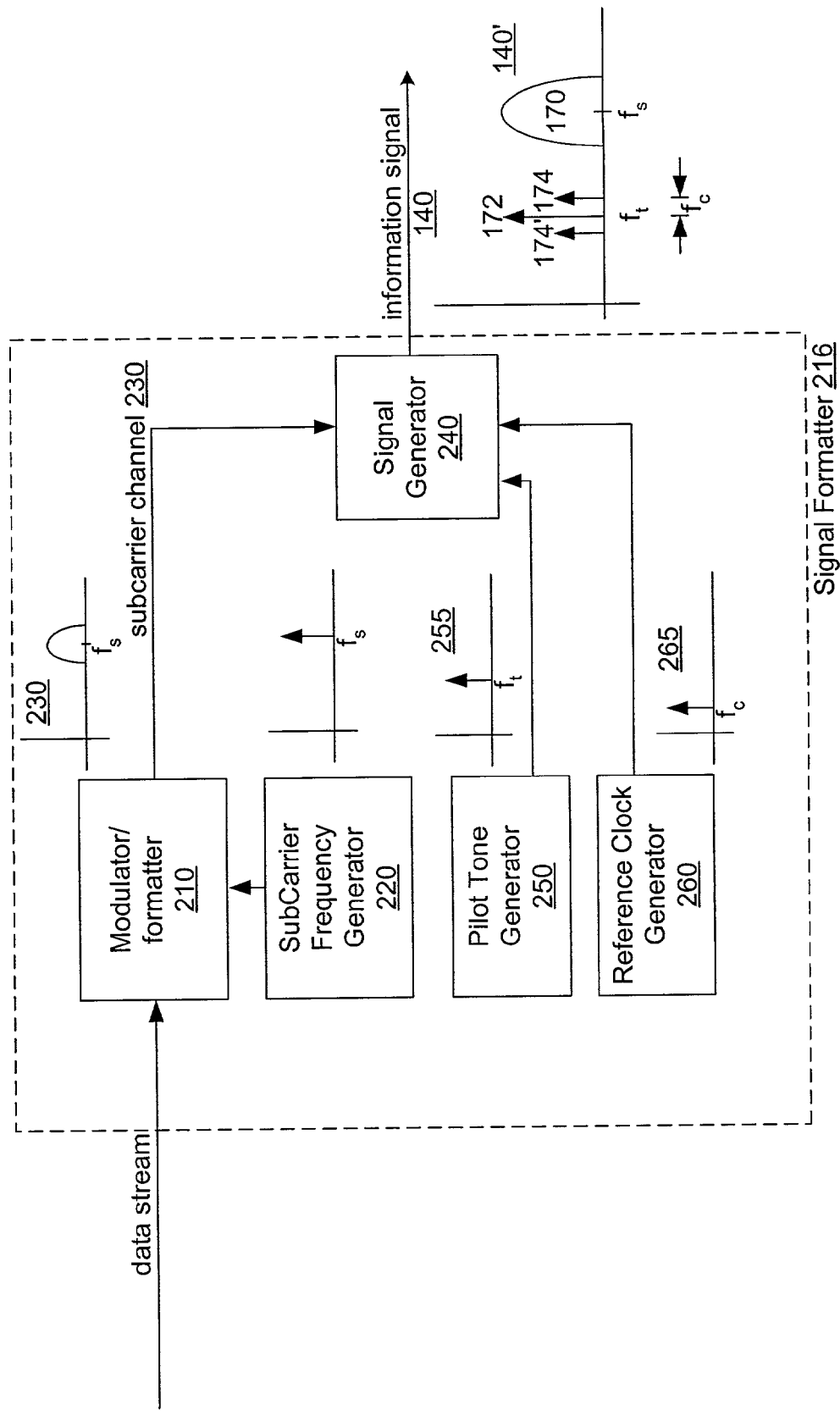
FIG. 2 is a block diagram of one embodiment of the signal formatter of FIG. 1.

FIG. 2 shows one embodiment 216 of signal formatter 116. Signal formatter 216 includes a data modulator 210 which receives data stream 118, a subcarrier frequency generator 220 coupled to data modulator 210, a signal generator 240 coupled to data modulator 210, and a pilot tone generator 250 and a reference clock generator 260 both coupled to signal generator 240.

Signal formatter 216 operates as follows. Data stream 118 is received by data modulator 210. Data modulator 210 includes a coherent modulator to modulate data stream 118 into subcarrier channel 230 which is characterized by a subcarrier frequency $f_S$ provided by subcarrier frequency generator 220. In one embodiment, data modulator 210 utilizes a QAM or QPSK modulation scheme, but one skilled in the art will recognize that other coherent modulation schemes are equally applicable. Coherent modulation provides an advantage over other modulation techniques by better using available bandwidth through use of a signal's phase information. However, a coherently modulated signal is susceptible to the phase noise generated by optical source 112 as well as any phase error introduced into system 100. In order to keep system 100 efficient, the effects of phase noise and phase error should be reduced. As will become evident in the discussion below, the present invention includes novel and advantageous ways of efficiently reducing the effects of phase noise and/or phase error.

Returning to FIG. 2, signal generator 240 receives subcarrier channel 230 from data modulator 210 as well as a pilot tone 255 at a frequency $f_t$ and a reference clock signal 265 at a frequency $f_C$ from pilot tone generator 250 and reference clock generator 260, respectively. Pilot tone generator 250, reference clock generator 260 and subcarrier frequency generator 220 are all conventionally implemented frequency generators and may consist phase-locked oscillators and multipliers, conventional crystal oscillators, astable vibrator circuits, digital signals, or other suitable frequency generators. Signal generator 240 combines the signals from data modulator 210, pilot tone generator 250 and reference clock generator 260 to produce information signal 140.

As noted above, spectrum 140' illustrates just one arrangement of the signals into information signal 140. By adjusting the frequencies generated by subcarrier frequency generator 220, pilot tone generator 250, and reference clock generator 260 different arrangements of the signals within information signal 140 can be generated. Furthermore, the pilot tone 255, reference clock signal 265 and subcarrier channel 230 can be combined in different ways to generate different information signals 140.

Figure 3:
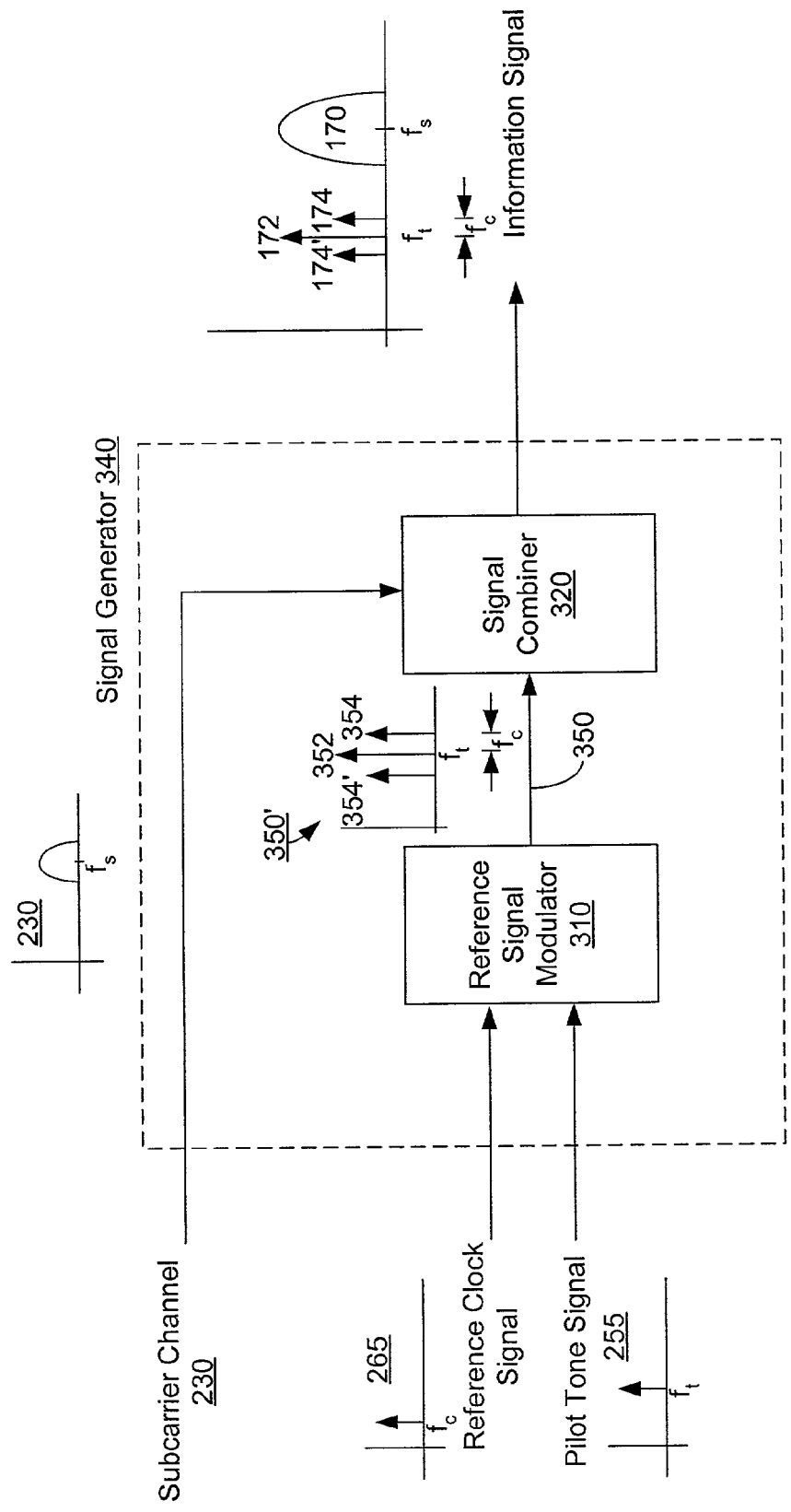
FIG. 3 is a block diagram of one embodiment of the signal generator of FIG. 2.

FIG. 3 illustrates one embodiment 340 of signal generator 240. Signal generator 340 includes a reference signal modulator 310 coupled to a signal combiner 320. Reference signal modulator 310 receives reference clock signal 265 and pilot tone 255 and modulates pilot tone 255 with reference clock signal 265 to generate reference signal 350. The frequency spectrum of a preferred embodiment of reference signal 350 is illustrated in a spectrum 350'. Spectrum 350' includes a pilot tone 352 at frequency $f_t$, and two reference clock sidebands 354, 354' offset from $f_t$ by $f_C$ resulting from the modulation. Signal combiner 320 receives reference signal 350 and subcarrier channel 230 and combines the signals to generate information signal 140. Signal combiner 320 may include a signal adder or other commonly known method for combining the signals into information signal 140.

In more detail, reference signal modulator 310 includes a non-coherent modulator. Examples of non-coherent modulation include AM modulation. As noted above, phase noise can interfere with the coherent modulation scheme utilized in data modulator 210. Therefore it is desirable to find a way to cancel or de-emphasize the effects of the phase noise on signal extractor 190. As will be shown below, pilot tone 255 and reference clock signal 265 are used by signal extractor 190 to help defeat the phase noise present at signal extractor 190. To aid in this process, modulator 310 utilizes an amplitude modulation scheme to modulate pilot tone 255 with reference clock signal 265. One skilled in the art will recognize that other non-coherent modulation schemes may also be used. By using an amplitude modulation scheme, reference clock signal 265 can be recovered by signal extractor 190 without interference from the phase noise.

Figure 4:
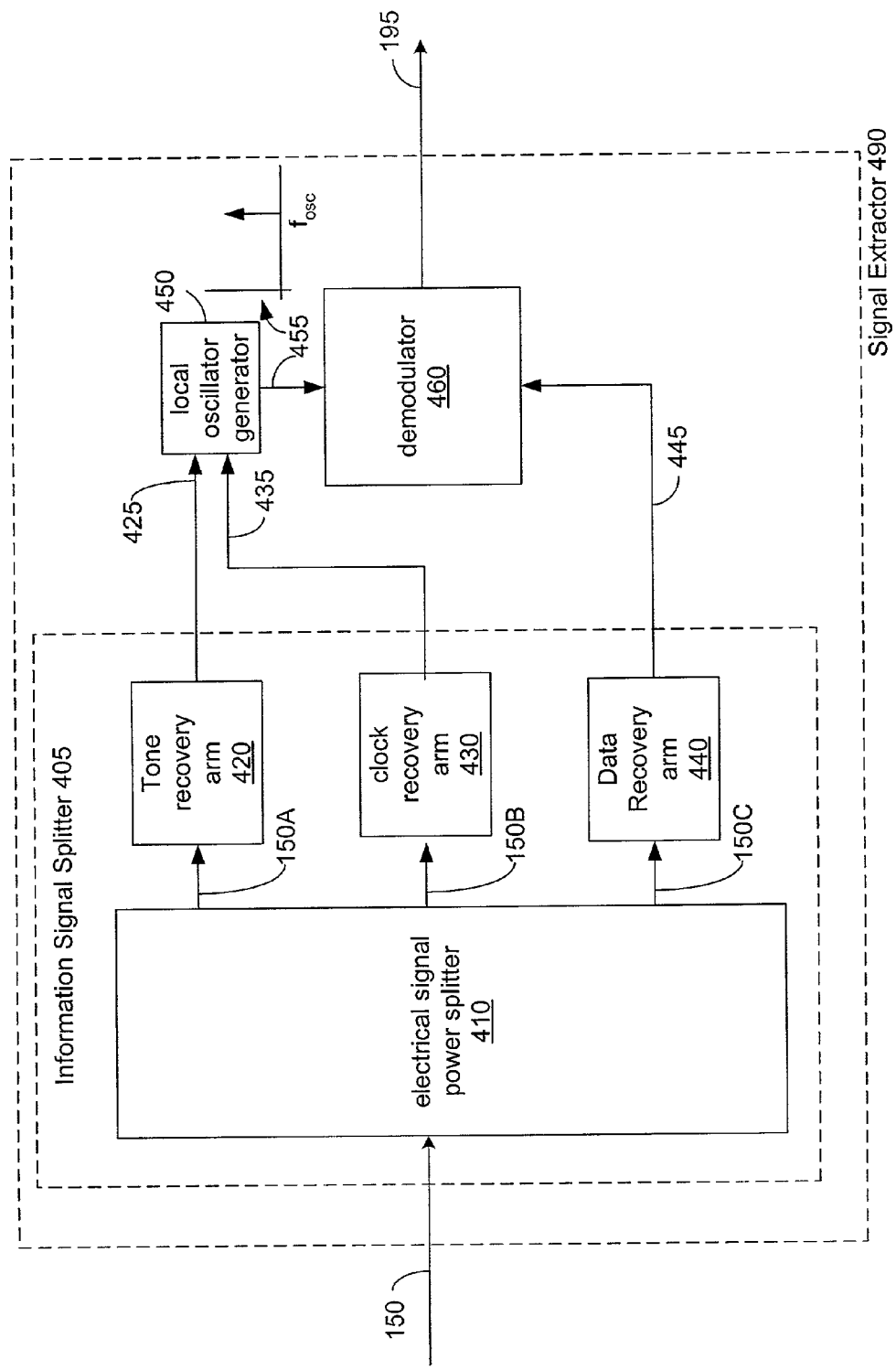
FIG. 4 is a block diagram of one embodiment of the signal extractor of FIG. 1.

FIG. 4 is a block diagram of an embodiment 490 of signal extractor 190. Signal extractor 490 includes an information signal splitter 405, coupled to a local oscillator generator 450 and to a demodulator 460. Local oscillator generator 450 is also coupled to demodulator 460. In one embodiment, information signal splitter 405 includes an electrical signal splitter 410, a tone recovery arm 420, a reference clock recovery arm 430, and a data recovery arm 440. Electrical signal splitter 410 is configured to receive electrical signal 150 and is coupled to each recovery arm 420, 430, and 440. Tone recovery arm 420 and clock recovery arm 430 are both coupled to local oscillator generator 450. Data recovery arm 440 and local oscillator generator 450 each output to demodulator 460 which outputs recovered data stream 195.

Signal extractor 490 operates as follows. Electrical signal 150 is received from heterodyne detector 180 by electrical signal splitter 410. Electrical signal splitter 410 generates three copies 150A, 150B, and 150C, of electrical signal 150, one for each recovery arm 420, 430, and 440. Data recovery arm 440 isolates the subcarrier channel 445, characterized by subcarrier frequency $f_S$ from electrical signal copy 150C and outputs subcarrier channel 445 along with the phase noise to demodulator 460. Tone recovery arm 420 isolates the pilot tone frequency component 154 from its electrical signal copy 150A and outputs a pilot tone component 425 at frequency $f_t$ and the phase noise to local oscillator generator 450. Reference clock recovery arm 430 isolates the pilot tone 154 and reference clock components 156, 156' from electrical signal copy 150B and outputs a reference clock signal 435 at frequency $f_C$ without phase noise to local oscillator generator 450. Local oscillator generator 450 receives both pilot tone 425 and reference clock 435 and generates an electrical local oscillator 455 at frequency $f_{OSC}$.

In the preferred embodiment $f_{OSC}$ is equal to $f_S$. This feature is particularly useful if $f_O$ is equal to $f_{LO}$ in heterodyne detector 180 so that electrical signal occupies the same frequency spaces as information signal 140. If $f_O$ is not equal to $f_{LO}$, it would be necessary to adjust $f_{OSC}$ to account for the incomplete downshifting of optical data signal 142 at heterodyne detector 180. Such adjustments are known to those skilled in the art and are contemplated within the scope of this invention. Local oscillator 455 has the same phase noise and group delay as subcarrier channel 445.

Specifically, in signals 150A-C, the pilot tone 154 and subcarrier channel 152 carry correlated phase noise since they were generated and transmitted together in transmitter 110 and heterodyne detected together in receiver 130. The phase noise in the pilot tone 154 traverses a signal path through the tone recovery arm 420 and local oscillator generator 450 to reach demodulator 460. The phase noise in the subcarrier channel 152 traverses a signal path through the data recovery arm 440 to reach demodulator 460. These two signal paths are matched so that the phase noise experiences the same group delay. Thus, when they arrive at demodulator 460, they will still be correlated and can be canceled at demodulator 460.

Returning to the general operation of signal extractor 490, local oscillator 455 is output to demodulator 460. Demodulator 460 demodulates subcarrier channel 445 with respect to local oscillator 455 and outputs recovered data stream 195. In a preferred embodiment ($f_O = f_{LO}$ at heterodyne detection) when local oscillator 455 has the same frequency $f_{OSC}$ as subcarrier channel 445, namely $f_S$, the recovered data 195 is completely downshifted to the original form of data stream 118. In embodiments utilizing a heterodyne detection where $f_O$ does not equal $f_{LO}$, an adjusted local oscillator frequency $f_{OSC}$ will be necessary to completely downconvert recovered data stream 195.

Demodulator 460 utilizes the same modulation scheme as used in signal formatter 116. In a preferred embodiment, demodulator 460 uses the same coherent demodulation scheme as data modulator 210. As noted in the discussion of data modulator 210, coherent demodulation schemes are susceptible to phase noise introduced by optical source 112 as well as any group delays within the signal recovery arms 420, 430, and 440. However, if the local oscillator 455 and data signal 445 include the same phase noise and group delay, then the phase distortions will cancel within demodulator 460 allowing efficient recovery of recovered data signal 195. As noted above, local oscillator generator 450 and data recovery arm 440 are designed to produce signals with correlated phase error and phase delay.

Figure 5:
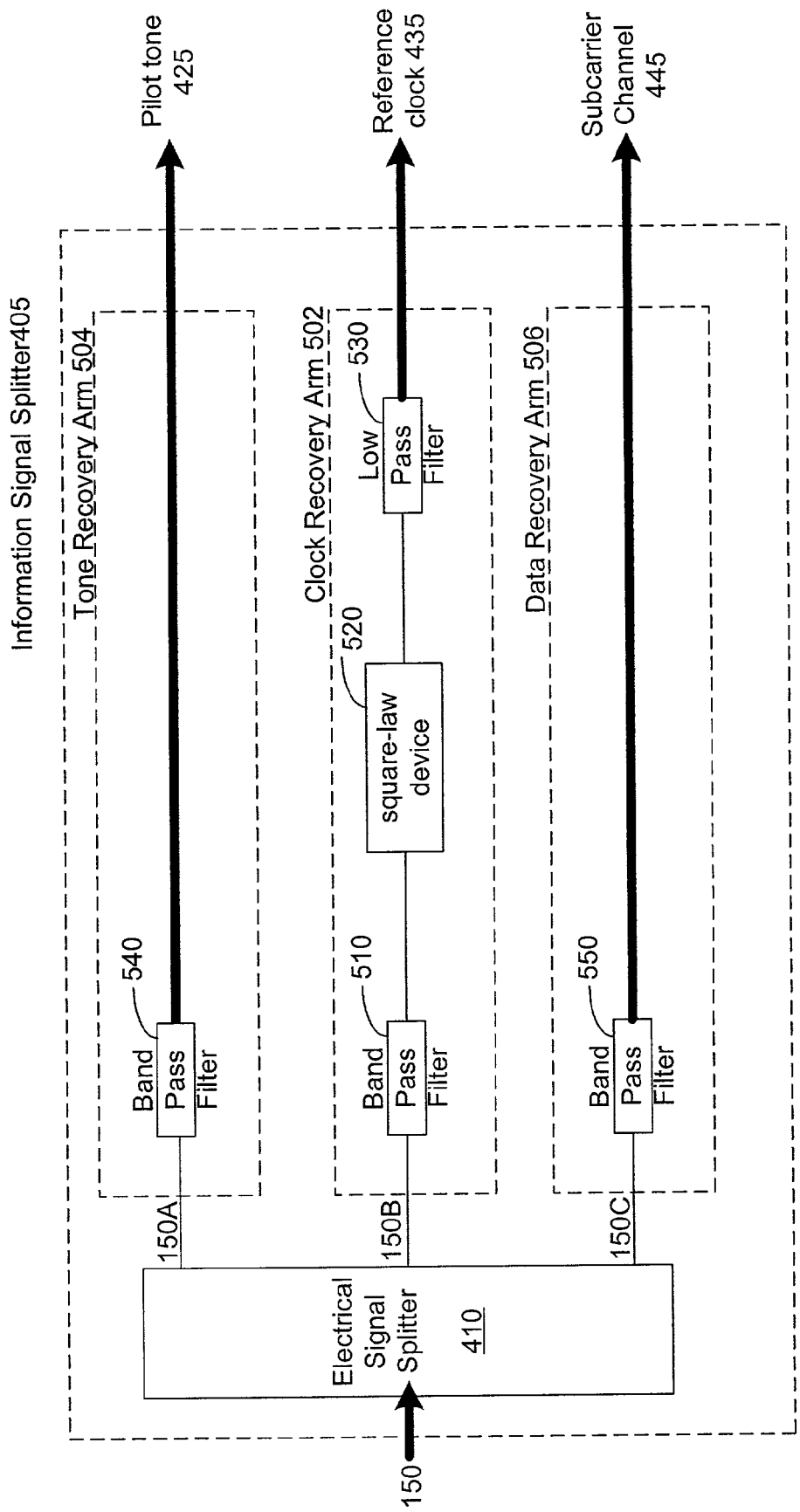
FIG. 5 is a block diagram of one embodiment of the information signal splitter of FIG. 4.

FIG. 5 is a block diagram of one embodiment of information signal splitter 405 including specific embodiments 502, 504 and 506 of clock recovery arm 430, tone recovery arm 420 and data recovery arm 440, respectively. In detail, clock recovery arm 502 includes a band pass filter 510 coupled to a square-law device 520, coupled to a low pass filter 530. Band pass filter 510 receives electrical signal copy 150B and isolates pilot tone 154 and at least one reference clock sideband 156, 156'. Square-law device 520 and low pass filter 530 are one implementation of an AM demodulator. They recover a reference clock signal 435 at frequency $f_C$ equal to the difference between pilot tone 154 and reference clock sideband 156. More specifically, square-law device 520 multiplies the incoming signal against itself. Low pass filter 530 filters out any higher frequency additive terms and recovers the low frequency difference term. As noted above and in the discussion of FIG. 3, by taking the difference term at low pass filter 530, the signal is effectively stripped of any phase noise and phase error from the reference clock signal. In other embodiments clock recovery arm 430 may include other structures known in the art to implement a non-coherent demodulation scheme corresponding to the scheme used by reference signal modulator 310.

Tone recovery arm 504 includes a band pass filter 540 configured to isolate pilot tone 154 from electrical signal 150A. Likewise, data recovery arm 506 includes a band pass filter 550 configured to isolate subcarrier channel 152 from electrical signal 150C. Both recovery arms 504, 506 preserve the phase noise introduced into optical data signal 142 by optical source 112. While recovery arms 540 and 550 are illustrated as using band pass filters, other methods for isolating the respective frequency components can be used.

Figure 6:
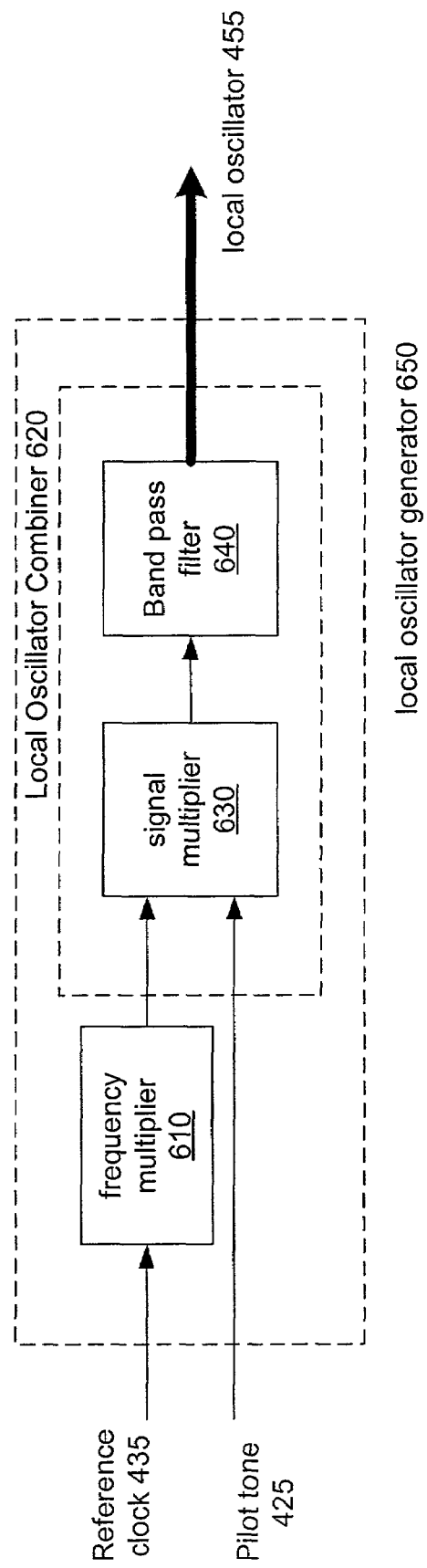
FIG. 6 is a block diagram of one embodiment of the local oscillator generator of FIG. 4.

FIG. 6 is a block diagram of an embodiment 650 of local oscillator generator 450. Local oscillator generator 650 includes a frequency multiplier 610 coupled to a local oscillator combiner 620. In one embodiment, local oscillator combiner 620 includes signal multiplier 630 coupled to band pass filter 640.

Local oscillator generator 650 operates as follows. Frequency multiplier 610 receives reference clock signal 435 at frequency $f_C$. Frequency multiplier 610 generates a multiplied clock 615 which is at a frequency which is a fractional multiple N of the frequency of the incoming reference clock 435. In other words the frequency of reference clock signal 435 is increased from $f_C$ to $N \cdot f_C$. In a preferred embodiment N is an integer factor. However, any reproducible factor can be chosen. Local oscillator combiner 620 combines pilot tone 425 and multiplied clock 615 to generate local oscillator 455 having the same phase noise and group delay as subcarrier channel 445. In a preferred embodiment, group delay matching is accomplished by ensuring that the signal paths are matched from separation to reconstruction.

In the embodiment shown in FIG. 6, signal multiplier 630 receives pilot tone 425 and multiplied clock 615. These two signals are multiplied together to form a difference signal and a sum signal. The difference signal is located at a difference between the frequencies of the tone 425 and multiplied clock 615. The sum signal is located at a sum of the frequencies of the tone 425 and multiplied clock 615. Note that the phase noise present with pilot tone 425 is preserved in both the sum signal and the difference signal since the reference clock signal 435 (and therefore also the multiplied clock signal 615) does not have a phase noise component. Generally, the phase noise comprises both optical and electrical phase noise. In DWDM systems, the phase noise may further comprise cross-phase modulation from other wavelengths carrying data signals as well as other phase noise arising from nonlinear optical coupling of two or more wavelength channels. The sum and difference signals are passed to band pass filter 640, which isolates one of the two signals for output as local oscillator 455. In effect, tone 425 is either shifted up or down in frequency by multiplied clock 615 to form local oscillator 455 depending on whether $f_t$ is higher or lower than $f_S$. The process for selecting N as well as for selecting $f_t$, $f_C$, and $f_S$ will be discussed below.

Figure 7:
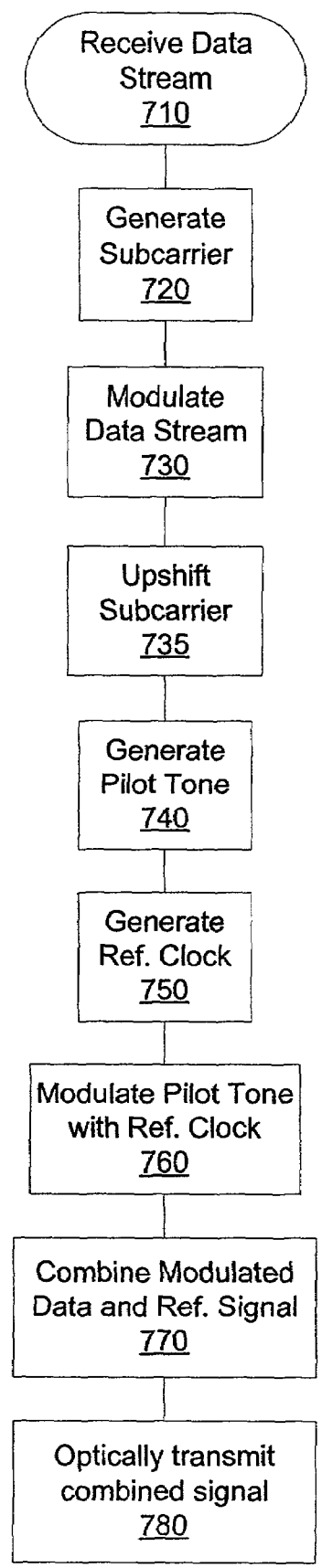
FIG. 7 is a flow diagram illustrating one method for selecting various signal frequencies and generating an optical data signal.

FIG. 7 is a flow diagram of a method 700 for selecting the various signal frequencies $f_C$, $f_t$, and $f_S$, and generating optical data signal 142. Reference numerals corresponding to FIGS. 1-6 have been included in parenthesis to provide an example of a specific embodiment of method 700. In method 700, a data stream (118) is received 710 and a subcarrier (220) is generated 720. The data stream is coherently modulated 730 onto the subcarrier (210, 230). In one embodiment, the subcarrier may be also be upshifted 735 according to a Wavelength Division Multiplexing scheme. In addition, both a pilot tone (250, 255) and a reference clock (260,265) are generated 740 and 750, respectively. The pilot tone is non-coherently modulated 760 with the reference clock signal (310, 350) to resist the effects of phase noise at a receiver (130). The modulated pilot tone and modulated data stream are combined 770 into an information signal (320, 140), which is optically transmitted 780.

In more detail, generation of the subcarrier, pilot tone and reference clock and the selection of their corresponding are interrelated with the overall design goals of the system. A change in the pilot tone frequency $f_t$ typically will change the reference clock frequency $f_C$ and/or the subcarrier frequency $f_S$.

As noted above in the discussion of local oscillator combiner 620, in one embodiment, a general formula for the interrelationship between the frequencies is as follows. $f_S = f_t +/- N \cdot f_C$, where N is some fraction and preferably an integer. In embodiments where the optical local oscillator (132) of the heterodyne detector (180) does not have the same frequency $f_{LO}$ as the optical carrier $f_O$ generated by the optical source 112, the combination of $N \cdot f_C +/- f_t$ should be adjusted accordingly to account for the offset between $f_{LO}$ and $f_O$. The pilot tone (265) is selected to be at a frequency $f_t$ suitable to form a base from which to generate local oscillator (455) at the demodulator (460). Furthermore, the pilot tone located at frequency $f_t$ should reside outside of a bandwidth defined by the subcarrier channel. The reference clock frequency and multiplied clock frequency are chosen to raise or lower the pilot tone (255) so that the resulting local oscillator frequency $f_{OSC}$ is equal to the subcarrier frequency $f_S$. Typically $f_t$ is close in frequency to $f_S$ while $f_C$ is a much lower frequency.

This arrangement provides several advantages By having a smaller $f_C$, when the pilot tone (255) is modulated with the reference clock (265), the resulting reference signal (350) has a smaller bandwidth. This promotes efficiency in transmitting the optical data signal (142) by allowing the pilot tone (146) and reference clock sidebands (148, 148') to fit in the frequency spectrum closer to the subcarrier channel (144). Furthermore, a small $f_C$ increases the scalability since several subcarrier frequencies can be used and several local oscillators can be matched to these subcarrier frequencies by simply changing the value of N for each subcarrier frequency. This particular embodiment will be discussed in more detail in conjunction with FIG. 10 below.

Figure 8:
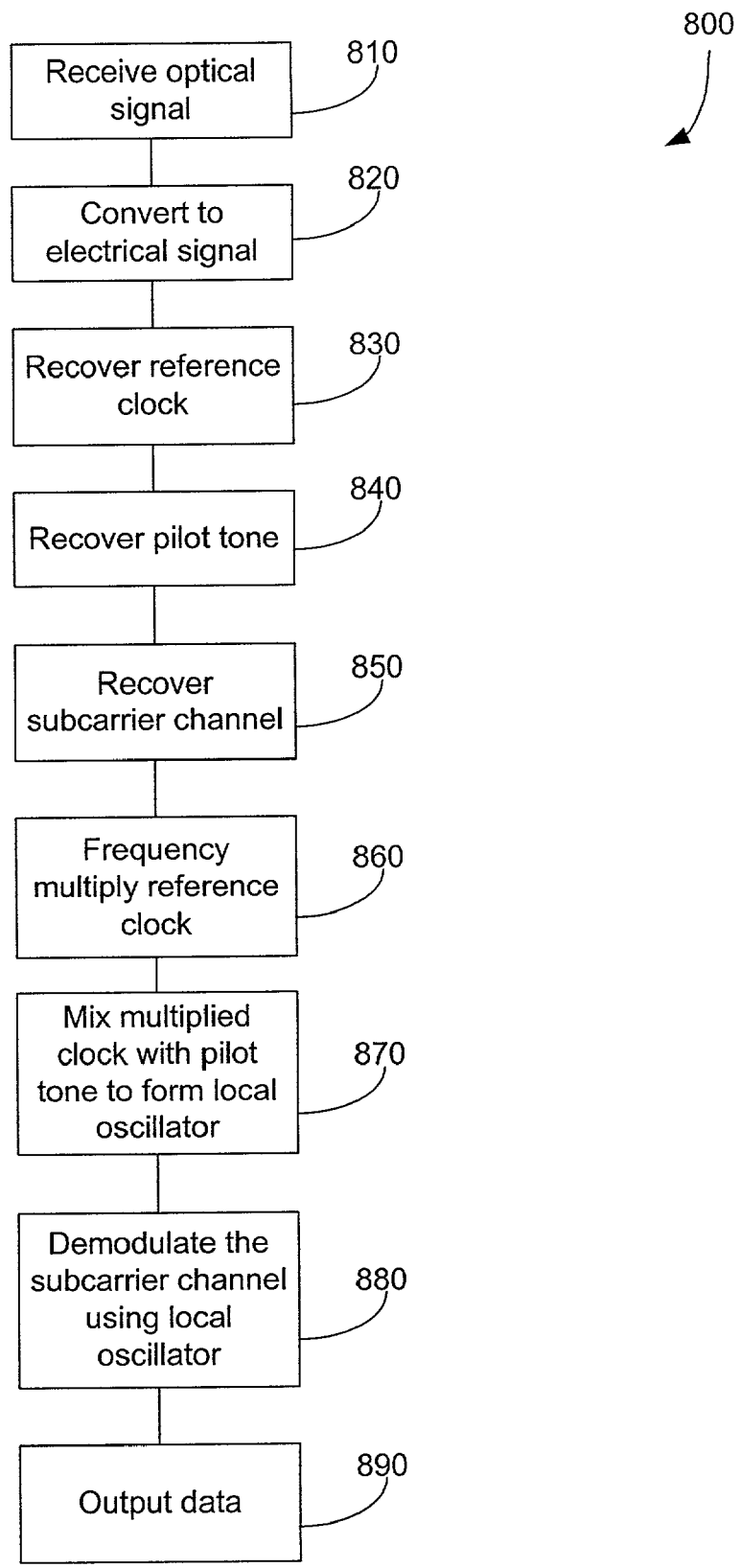
FIG. 8 is a flow diagram illustrating one method of receiving and demodulating an optical data signal.

FIG. 8 is a flow diagram illustrating one method 800 of receiving and demodulating optical data signal 142. Reference numerals corresponding to FIGS. 1-6 have been included in parenthesis to provide an example of a specific embodiment of method 800. An optical signal (142) is received 810 and converted 820 to an electrical signal (150) while preserving the phase noise on the signal (142). The pilot tone (154) in the electrical signal is incoherently demodulated 830 to generate a reference clock signal (435) without phase noise. The pilot tone (425) is also recovered 840, but with phase noise. A coherently modulated data stream (445) is also recovered 850 with a phase noise correlated to the phase noise in the pilot tone. The recovered clock signal is frequency multiplied 860 to generate a multiplied clock signal (615), which is mixed 870 with the recovered pilot tone (425) to produce an electrical local oscillator (455) with the same phase noise as in the pilot tone. The coherently modulated data stream (445) is coherently demodulated 880 with respect to the recovered local oscillator (425) to produce a recovered data stream (195). In the demodulation process, the phase noise in the data stream and the local oscillator cancel. The recovered data stream (195) is output 890.

Figure 9:
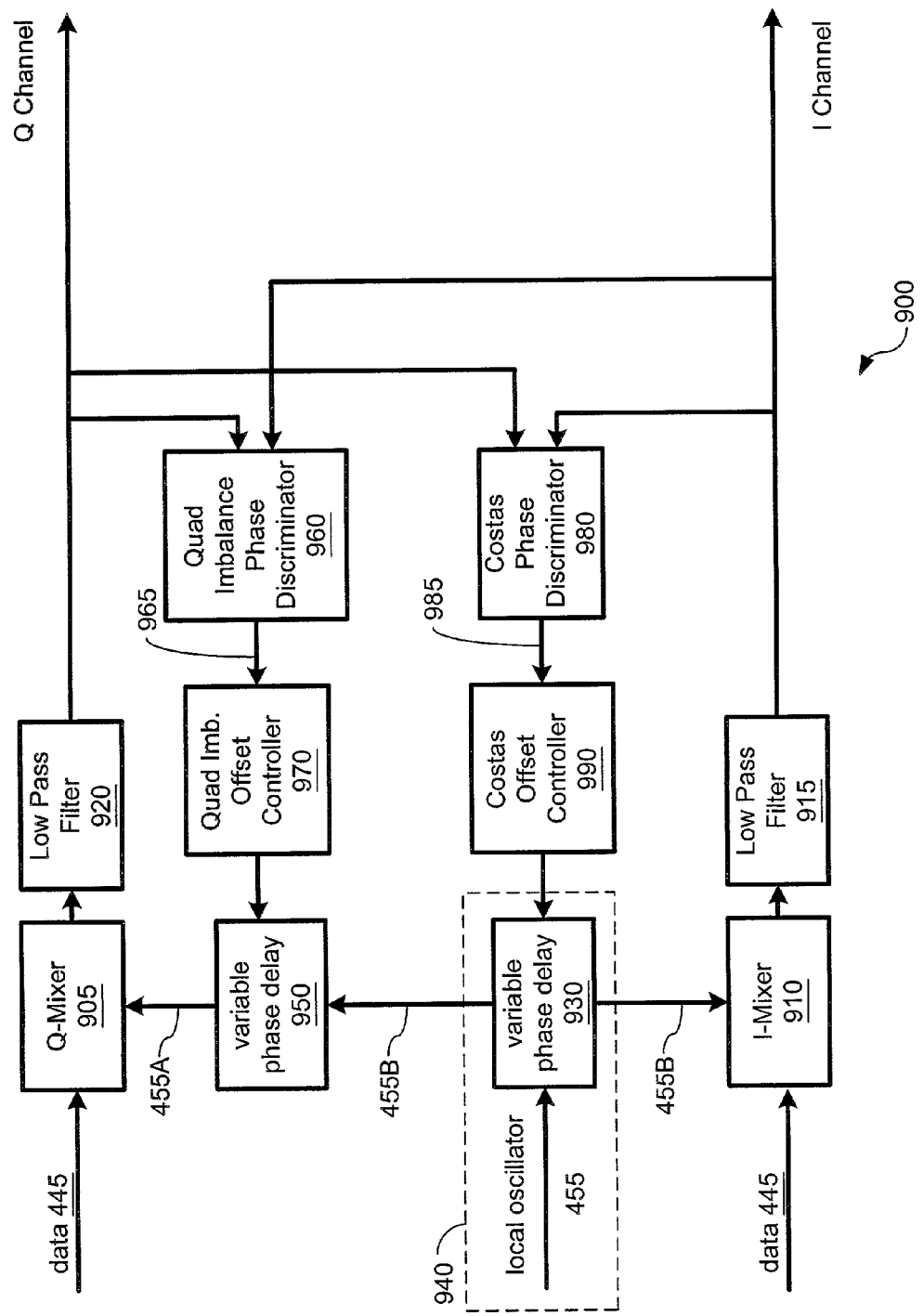
FIG. 9 is a block diagram of one embodiment of the demodulator of FIG. 4.

FIG. 9 illustrates a preferred embodiment 900 of demodulator 460. Demodulator 900 includes a Q-mixer 905, an I-mixer 910, a low pass filter 915, a second low pass filter 920, a variable phase delay 930, a second variable phase delay 950, a quad imbalance phase discriminator 960, a quad imbalance offset controller 970, a Costas loop phase discriminator 980 and a Costas loop offset controller 990. Subcarrier channel 445 is received by both Q-mixer 905 and I-mixer 910, which outputs are filtered through low pass filters 920 and 915, respectively. The output from the low pass filters 920 and 915 constitute the output from demodulator 900, which are the recovered Q and I channels, respectively.

Local oscillator 455 is received by variable phase delay 930, which selectively increases or decreases the phase of local oscillator 455. Variable phase delay 930 outputs the phase delayed local oscillator to I-mixer 910 and to second variable phase delay 950. Second variable phase delay 950 adds approximately 90° of phase to the phase delayed local oscillator and outputs the signal to Q-mixer 905. Quad imbalance phase discriminator 960 receives the output from both low pass filters 920, 915. Quad imbalance phase discriminator 960 is coupled to quad imbalance offset controller 970 which in turn is coupled to variable phase delay 950. Similarly, Costas loop phase discriminator 980 receives the output from both low pass filters 920, 915 and is coupled to Costas offset controller 990 which in turn is coupled to variable phase delay 930.

Demodulator 900 operates as follows. Demodulator 900 coherently demodulates subcarrier channel 445 to produce an I channel and a Q channel of recovered data 195. In a preferred embodiment the modulation is QPSK. However, other forms of modulation may also be used, such as Quadrature Amplitude Modulation (QAM), Frequency Shift Keying (FSK), Amplitude Shift Keying (ASK), Phase Shift Keying (PSK), BiPhase Shift Keying (BPSK), and On Off Keying (OOK). Generally, in QPSK, two data channels are modulated by subcarrier signals which have the same reference frequency, but are 90° out of phase, allowing the signals to be combined without significant interference for more efficient use of bandwidth. At the demodulation stage, such as demodulator 900, the combined signal is again mixed with the two 900 out-of-phase reference signals reproducing the original two data channels.

In a preferred embodiment, subcarrier channel 445 is input into Q-mixer 905 and I-mixer 910. In mixers 905 and 910, subcarrier channel 445 is mixed with two variants of local oscillator 455, 455A and 455B, to recover the Q and I channels respectively. As with most demodulation schemes, the resultant signals from Q and I mixers 905, 910 contains a difference component and a sum component. Low pass filters 920, 915 filter the outputs of Q-mixer 905 and I-mixer 910 respectively to allow only the difference components to be output. By selecting the difference component, phase noise is effectively cancelled.

Local oscillator 455 is received into the demodulator by variable phase delay 930. Variable phase delay 930 selectively adjusts the phase on local oscillator 455 to generate 455B and passes the signal 455B to I-mixer 910 via second variable phase delay 950. While depicted in FIG. 9 as an external local oscillator signal 455 coupled to the variable phase delay 930, local oscillator 455B may more generally be generated directly by an oscillator 940. One such oscillator 940 would be a voltage controlled oscillator (VCO) which receives the output of the Costas Offset Controller 990 as control input. Second variable phase delay 950 is a typical component in any basic QPSK demodulator. Second variable phase delay 950 typically adds approximately an additional 90° of phase to local oscillator 455B but may selectively adjust the amount of phase added to local oscillator 455B to produce 455A which is used by Q-mixer 905 to demodulate the Q channel from subcarrier channel 445.

Variable phase delays 930 and 950 operate as follows. Variable phase delay 930 adjusts the phase of local oscillator 455 to match the phase of subcarrier channel 445. To control this adjustment, demodulator 900 uses Costas loop phase discriminator 980. Costas loop phase discriminator 980 generates an error signal 985 from sampling the I and Q channels from the output of low pass filters 915 and 920. Error signal 985 is calculated based on the quantity $<I \cdot |Q|> - <Q \cdot |I|>$ where I and Q are outputs of the quadrature demodulator and the operator $< >$ indicates a time average and $| |$ indicates a Signum function. The error signal 985 is a measure of the phase offset between the local oscillator phase and the phase of the incoming signal. Costas loop offset controller 990 uses error signal 985 to control variable phase delay 930. The goal of Costas loop offset controller 990 is to adjust the phase so that error signal 985 is driven to zero.

Variable phase delay 950 adjusts the phase of local oscillator 455B to match the amount of phase difference between the I and Q channels. As noted above, in ideal conditions the I and Q channels are modulated 90° out of phase. Ideally, 90° of phase should be added by second variable phase delay 950 to efficiently recover the I and Q channels. However, operating conditions may exist where the I and Q channels may be more or less than 90° out of phase. Variable phase delay 950 effectively fine tunes the phase shifting to match operating conditions. To control this adjustment demodulator 900 uses quad imbalance phase discriminator 960. Quad imbalance phase discriminator 960 generates an error signal 965 from sampling the I and Q channels from the output of low pass filters 915, and 920. Error signal 965 is calculated based on the quantity $<I \cdot |Q|> + <Q \cdot |I|>$. This error signal 965 measures quadrature imbalance, i.e. the extent to which phase offset between I and Q differs from $\pi/2$. Quad imbalance offset controller 970 uses error signal 965 to control variable phase delay 950. The goal of quad imbalance offset controller 970 is to adjust the relative phase enough so that error signal 965 is driven to zero.

Figure 10:
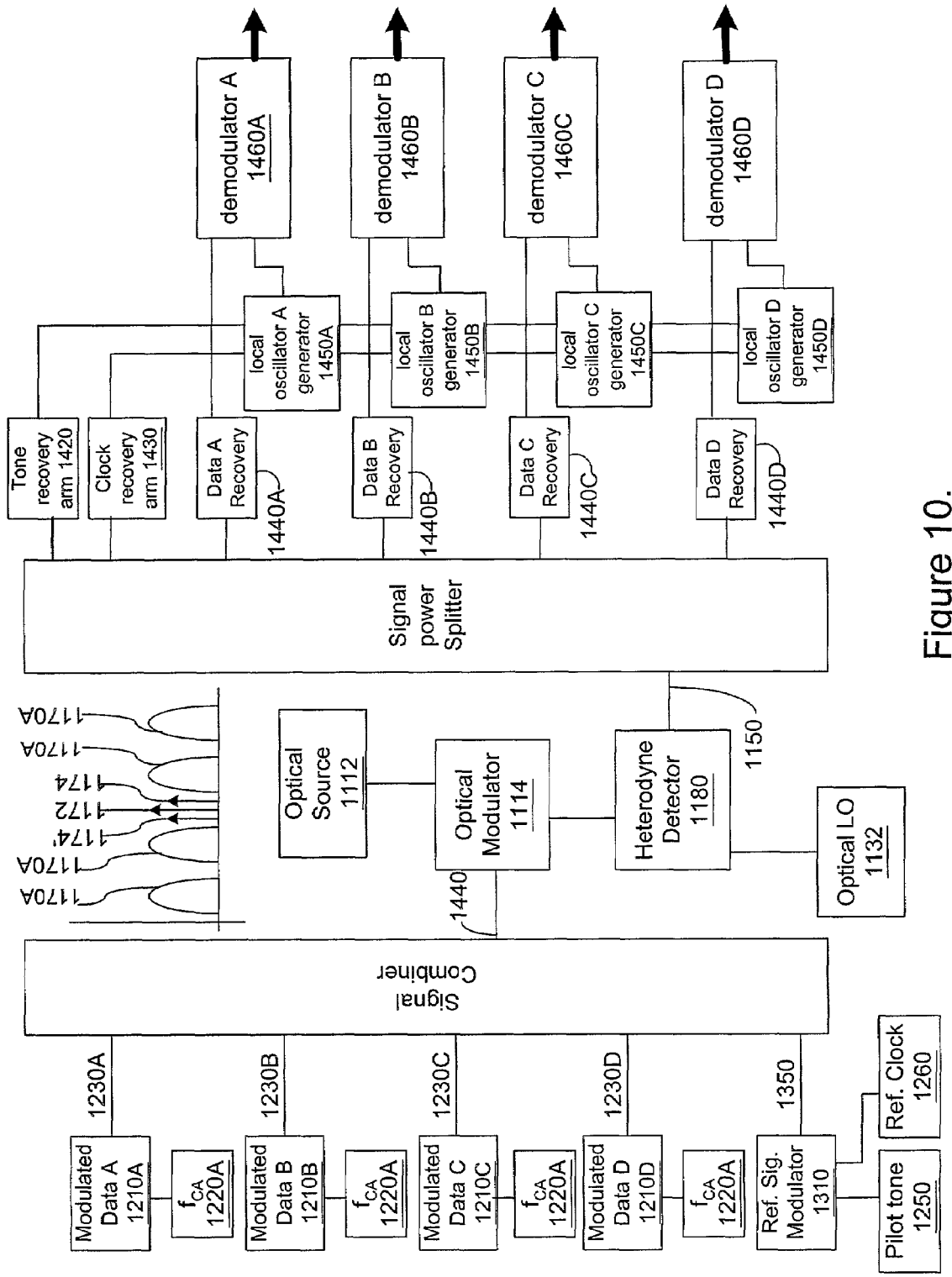
FIG. 10 is a block diagram of one embodiment of a multi-channel communications system using heterodyne detection.

FIG. 10 illustrates one embodiment 1000 of a multichannel communications system using heterodyne detection. In system 100 of FIG. 1, there was a single subcarrier channel 170 and a single corresponding pilot tone 172 and reference clock signal 174. In system 1000, there are many subcarrier channels 1170 which share a common pilot tone 1172 and reference clock signal 1174.

On the transmit side, communication system 1000 includes a plurality of data modulators 1210A-D, a plurality of corresponding subcarrier frequency generators 1220A-D, a signal combiner 1320, an optical modulator 1114 an optical source 1112 and an optical fiber 1120. On the receive side, communication system 1000 includes a heterodyne detector 1180, an optical local oscillator generator 1132, a signal power splitter 1410, a tone recovery arm 1420, a clock recovery arm 1430, a plurality of data recovery arms 1440A-D, a plurality of corresponding local oscillator generators 1450A-D, and corresponding demodulators 1460A-D.

Modulators 1210A-D each receive a unique subcarrier frequency from subcarrier frequency generators 1220A-D. Modulators 1210A-D are coupled to signal combiner 1320 which in turn is coupled to optical modulator 1114. Optical modulator 1114 also receives an optical carrier from optical source 1112 and is coupled to optical fiber 1120. Heterodyne detector 1180 receives input from fiber 1120 and optical local oscillator 1132 and outputs to signal power splitter 1410. Signal power splitter 1410 outputs to tone recovery arm 1420, clock recovery arm 1430 and data recovery arms 1440A-D. Tone recovery arm 1420 and clock recovery arm 1430 are coupled to each of the local oscillator generators 1450A-D. Data recovery arms 1440A-D and local oscillator generators 1450A-D are pairwise matched and coupled to their respective demodulators 1460A-D.

Communication system 1000 operates as follows. Each individual part operates as discussed above. For ease of recognition, similar numbers have been used where appropriate. Furthermore, elements unique to a single data channel have been designated with an A-D suffix. Elements having the same suffix work together to provide a single data channel. Generally, modulators 1210A-D each operate to modulate a separate data stream (not shown) onto a unique subcarrier frequency $f_{Cx}$ provided by subcarrier frequency generators 1220A-D respectively. The outputs from modulators 1210A-D represent a plurality of data channels 1230A-D.

Reference signal modulator 1310 operates as discussed with respect to FIG. 3. Reference signal modulator 1310 modulates a pilot tone from pilot tone generator 1250 with a reference clock from reference clock generator 1260 to form reference signal 1350. Data channels 1230 A-D and reference signal 1350 are combined by signal combiner 1320 to form a single frequency multiplexed information signal 1140. Information signal 1140 has a plurality of subcarrier channels 1170A-D each corresponding to a data channel 1230A-D. Information 1140 signal further includes a pilot tone 1172 and a pair of reference clock sidebands 1174, 1174', corresponding to reference signal 1350. Information signal 1140 is received by optical modulator 1114 which optical transmits information signal 1140 as an optical signal 1142 on an optical carrier provided by optical source 1112 over fiber 1120 and is received by heterodyne detector 1180.

Using optical local oscillator 1132, heterodyne detector 1180 receives and converts optical signal 1142 into an electrical signal 1150. Electrical signal 1150 is split into a plurality of identical signals by signal power splitter 1410. Tone recovery arm 1420, clock recovery arm 1430, and data recovery arms 1440A-D each receive a split signal. Tone recovery arm 1420 recovers the pilot tone. Clock recovery arm 1430 recovers the reference clock. Each data recovery arm 1440A-D isolates its designated subcarrier channel A-D. Tone recovery arm 1430 and clock recovery arm 1430 provide input to each local oscillator generators 1450A-D.

As in the single channel embodiment, local oscillator generators 1450A-D multiply the reference clock signal by N and mix it with the pilot tone signal to generate a $f_{OSC}$ equal to $f_S$. In communication system 1000, however, each local oscillator 1450A-D has a unique N to facilitate using the same clock signal and pilot tone signal to generate unique local oscillators matching their respective subcarrier frequencies generated by subcarrier frequency generators 1220A-D. In terms of the formulas noted above in the discussion of FIGS. 7 and 8, the $N_x$ is chosen such that:

$f_t +/- N_x \cdot f_C = f_{OSCx} = f_{Sx}$ where x designates one of the data channels A-D. Demodulators 1460A-D may be identical in operation and construction. Demodulators 1460A-D receive the unique local oscillators from local oscillator generators 1450A-D and their corresponding subcarrier channels from data recovery arms 1440A-D, and demodulate the subcarrier channels with respect to local oscillators 1450A-D to recover the original data channels.

Although the invention has been described in considerable detail with reference to certain embodiments thereof, other embodiments are possible. Therefore, the scope of appended claims should not be limited to the description of the preferred embodiments contained herein.

What is claimed is:

1. An optical communications system comprising:
  a transmitter subsystem comprising:
    a pilot tone generator for generating a pilot tone at a pilot tone frequency;
    a reference clock generator for generating a reference clock signal at a reference clock frequency;
    a signal generator coupled to the pilot tone generator and the reference clock generator, wherein the signal generator includes an incoherent reference signal modulator configured to generate a reference signal by using the reference clock signal to modulate the pilot tone, and wherein the signal generator is configured to combine the reference signal with a subcarrier channel into an information signal; and
    an optical modulator coupled to the signal generator for generating an optical signal, the optical signal including the reference signal and the subcarrier channel;
    wherein the signal generator is further configured to combine additional subcarrier channels into the information signal, wherein each subcarrier channel includes a coherently modulated data stream and is located at a unique subcarrier frequency.

2. The optical communications system of claim 1 wherein the subcarrier channel includes a coherently modulated data stream and is located at a subcarrier frequency.

3. The optical communications system of claim 1 wherein in generating the optical signal, the optical modulator preserves a phase relationship between the pilot tone and the subcarrier channel.

4. The optical communications system of claim 1 wherein a power in the reference clock signal of the optical signal is substantially lower than 30 dB down from a total power in the optical signal.

5. The optical communications system of claim 1 wherein within the information signal the frequency space occupied by the reference signal does not overlap with the frequency space occupied by the subcarrier channel.

6. The optical communications system of claim 1 wherein the signal generator further comprises:
  a signal combiner coupled to the incoherent reference signal modulator for combining the reference signal and the subcarrier channel.

7. The optical communications system of claim 1 wherein the incoherent reference signal modulator includes an AM modulator.

8. The optical communications system of claim 1 wherein the reference clock signal is a tone.

9. The optical communications system of claim 1 wherein the difference between the pilot tone frequency and the subcarrier frequency is a fractional multiple of the reference clock frequency.

10. The optical communications system of claim 9 wherein the fractional multiple is an integer multiple.

11. The optical communications system of claim 1 wherein the subcarrier channel includes a QPSK modulated data stream.

12. The optical communications system of claim 1 wherein the signal generator comprises:
  a signal combiner coupled to the incoherent reference signal modulator for combining the reference signal and the subcarrier channels;
  wherein within the information signal, the frequency space occupied by the reference signal does not overlap with the frequency space occupied by the subcarrier channel.

13. The optical communications system of claim 12 wherein the incoherent reference signal modulator includes an AM modulator.

14. The optical communications system of claim 1 wherein the difference between the pilot tone frequency and each subcarrier frequency is a fractional multiple of the reference clock frequency.

15. The optical communications system of claim 14 wherein the fractional multiple is an integer multiple.

16. The optical communications system of claim 1 wherein the inclusion of the pilot tone and the reference clock signal in the optical signal does not appreciably increase a bandwidth occupied by the optical signal.

17. An optical communications system comprising:
  a transmitter subsystem comprising:
    a pilot tone generator for generating a pilot tone at a pilot tone frequency;
    a reference clock generator for generating a reference clock signal at a reference clock frequency;
    a signal generator coupled to the pilot tone generator and the reference clock generator for combining the pilot tone, the reference clock signal and a subcarrier channel into an information signal; and
    an optical modulator coupled to the signal generator for generating an optical signal, the optical signal including the pilot tone, the reference clock signal, and the subcarrier channel; and
  a receiver subsystem comprising:
    a heterodyne detector for receiving an optical signal and converting it to an electrical information signal, the electrical information signal comprising a pilot tone, a reference clock signal, and a subcarrier channel;
    an information signal splitter coupled to the heterodyne detector for dividing the information signal into the pilot tone, the reference clock signal, and the subcarrier channel;
    a local oscillator generator coupled to the information signal splitter for generating a local oscillator from the pilot tone and the reference clock signal;
    a demodulator coupled to the information signal splitter and the local oscillator generator, for demodulating the subcarrier channel using the local oscillator; and
    wherein, at the demodulator, phase noise contained in the local oscillator is correlated with phase noise contained in the subcarrier channel.

18. The optical communications system of claim 17 wherein the demodulator comprises a coherent demodulator.

19. The optical communications system of claim 17 wherein the phase noise comprises one or more from the list of:

laser phase noise;
electrical phase noise; and
phase noise from nonlinear optical coupling between two or more wavelength channels.

20. The optical communications system of claim 17 wherein the phase noise is the result of cross phase modulation.

21. An optical communications system comprising:
a receiver subsystem comprising:
 a heterodyne detector for receiving an optical signal and converting it to an electrical information signal, the electrical information signal comprising a pilot tone at a pilot tone frequency, a reference clock signal at a reference clock frequency, and a subcarrier channel located at a subcarrier frequency;
 an information signal splitter coupled to the heterodyne detector for dividing the information signal into the pilot tone, the reference clock signal, and the subcarrier channel;
 a local oscillator generator coupled to the information signal splitter for generating a local oscillator from the pilot tone and the reference clock signal;
 a demodulator coupled to the information signal splitter and the local oscillator generator, for demodulating the subcarrier channel using the local oscillator; and
 wherein, at the demodulator, phase noise contained in the local oscillator is correlated with phase noise contained in the subcarrier channel.

22. The optical communications system of claim 21, wherein the demodulator comprises a coherent demodulator.

23. The optical communications system of claim 21, wherein the information signal splitter is configured to upshift and downshift the pilot tone.

24. The optical communications system of claim 21, wherein the phase noise comprises one or more from the list of:
laser phase noise;
electrical phase noise; and
phase noise from nonlinear optical coupling between two or more wavelength channels.

25. The optical communications system of claim 21, wherein the phase noise is the result of cross phase modulation.

26. The optical communications system of claim 21 wherein:
the information signal splitter comprises:
 a data recovery section for recovering the subcarrier channel from the information signal; and
 pilot tone recovery section for recovering the pilot tone from the information signal; and
wherein a group delay through the data recovery section to the coherent demodulator is matched to a group delay through the pilot tone recovery section and local oscillator generator to the coherent demodulator.

27. The optical communications system of claim 26 wherein the group delays are matched by matching a path length through the pilot tone recovery section and local oscillator generator to a path length through the data recovery section.

28. The optical communications system of claim 21 wherein the information signal sputter comprises:
a reference clock recovery section for recovering the reference clock signal from the information signal, wherein the recovered reference clock signal is substantially free from phase noise.

29. The optical communications system of claim 28, wherein the phase noise may be introduced at the receiver or at a transmitter.

30. The optical communications system of claim 28 wherein:
within the electrical information signal, the reference clock signal is incoherently modulated onto the pilot tone; and
the reference clock recovery section comprises:
 a bandpass filter tuned to extract the modulated pilot tone from the electrical information signal;
 a square-law device coupled to the bandpass filter to demodulate the reference clock signal from the pilot tone, and
 a lowpass filter coupled to the square-law device for recovering the reference clock signal.

31. The optical communications system of claim 30 wherein, within the electrical information signal, the reference clock signal is AM modulated onto the pilot tone.

32. The optical communications system of claim 21 wherein the local oscillator generator comprises:
a frequency multiplier coupled to the information signal splitter for multiplying the reference clock signal by a fraction; and
a mixer coupled to the frequency multiplier and the information signal splitter, for mixing the multiplied reference clock signal with the pilot tone to produce the local oscillator.

33. The optical communications system of claim 32 wherein the fraction is an integer.

34. The optical communications system of claim 32 wherein:
the reference clock signal is substantially free from phase noise; and
the local oscillator signal contains phase noise substantially identical to phase noise contained in the pilot tone.

35. The optical communications system of claim 32 wherein a frequency of the local oscillator is equal to the subcarrier frequency.

36. The optical communications system of claim 21 wherein:
at the coherent demodulator, the phase noise contained in the local oscillator substantially cancels the phase noise contained in the subcarrier channel.

37. The optical communications system of claim 21 wherein:
the electrical information signal further comprises additional subcarrier channels, wherein each subcarrier channel is located at a unique subcarrier frequency;
the information signal splitter further divides the information signal into the subcarrier channels;
the receiver subsystem further comprises:
 additional local oscillator generators, each local oscillator generator coupled to the information signal splitter for generating an additional local oscillator;
 additional demodulators, each demodulator coupled to the information signal splitter and the local oscillator generator, for demodulating one of the additional subcarrier channels using one of the additional local oscillators; and
 wherein, at each demodulator, phase noise contained in the additional local oscillator is correlated with phase noise contained in the additional subcarrier channel.

38. The optical communications system of claim 37 wherein each local oscillator generator comprises:
- a frequency multiplier coupled to the information signal splitter for multiplying the reference clock signal by a fraction; and
- a mixer coupled to the frequency multiplier and the information signal splitter, for mixing the multiplied reference clock signal with the pilot tone to produce the local oscillator.

39. The optical communications system of claim 38 wherein:
- the reference clock signal is substantially free from phase noise; and
- the local oscillator signal contains phase noise substantially identical to phase noise contained in the pilot tone.

40. The optical communications system of claim 38 wherein a frequency of each local oscillator is equal to the corresponding subcarrier frequency.

41. The optical communications system of claim 21 wherein the demodulator comprises a QPSK demodulator.

42. The optical communications system of claim 21 wherein the demodulator comprises one from the list of:
- a Quadrature Amplitude Modulation demodulator;
- a Frequency Shift Keying demodulator;
- an Amplitude Shift Keying demodulator;
- a Phase Shift Keying demodulator;
- an On Off Keying demodulator; and
- a BiPhase Shift Keying demodulator.

43. The optical communications system of claim 41 wherein the demodulator comprises:
- an input for the local oscillator;
- a first variable phase delay coupled to the input for the local oscillator;
- an I-channel mixer coupled to the first variable phase delay and coupled to receive the subcarrier channel, for demodulating the subcarrier channel to produce an I-channel;
- a second variable phase delay coupled to the first variable phase delay and centered at 90 degrees phase;
- a Q-channel mixer coupled to the second variable phase delay and coupled to receive the subcarrier channel, for demodulating the subcarrier channel to a Q-channel;
- a Costas phase discriminator coupled to the I-channel mixer, the Q-channel mixer, and the first variable phase delay, configured to vary the phase delay of the first variable phase delay to correct a phase imbalance between the I and Q channels and the subcarrier channel, and
- a quadrature imbalance compensated phase discriminator coupled to the I-channel mixer, the Q-channel mixer, and the second variable phase delay, configured to vary the phase delay of the second variable phase delay to correct phase imbalance between the I channel and the Q channel.

44. A method for transmitting a data stream using an optical communications system, the method comprising:
- generating a pilot tone at a pilot tone frequency;
- generating a reference clock signal at a reference clock frequency;
- receiving a subcarrier channel, wherein the subcarrier channel includes a coherently modulated data stream and is located at a subcarrier frequency;
- generating a reference signal by using the reference clock to modulate the pilot tone;
- combining the generated reference signal and the subcarrier channel into an information signal; and
- generating an optical signal from the information signal, the optical signal including the generated reference signal and the subcarrier channel;
- wherein the step of combining the generated reference signal and the subcarrier channel comprises:
  - combining additional subcarrier channels into the information signal, wherein each subcarrier channel includes a coherently modulated data stream and is located at a unique subcarrier frequency.

45. The method of claim 44 wherein in generating the optical signal, the optical modulator preserves the phase relationship between the pilot tone and subcarrier.

46. The method of claim 44 wherein the step of combining the generated reference signal and subcarrier channel comprises:
- combining the reference signal and subcarrier channel into the information signal;
- wherein within the information signal the frequency space occupied by the reference signal does not overlap with the frequency space occupied by the subcarrier channel.

47. The method of claim 44 wherein a difference between the pilot tone frequency and the subcarrier frequency is a fractional multiple of the reference clock frequency.

48. The method of claim 47 wherein the fractional multiple is predetermined.

49. The method of claim 44 wherein the step of combining the generated reference signal and subcarrier channel further includes:
- combining the reference signal and the subcarrier channels into the information signal.

50. The method of claim 44 wherein a difference between the pilot tone frequency and each subcarrier frequency is a fractional multiple of the reference clock frequency.

51. A method for recovering a data stream using an optical communications system, the method comprising:
- receiving an optical signal;
- converting the received optical signal to an electrical information signal using heterodyne detection, the electrical information signal comprising a pilot tone at a pilot tone frequency, a reference clock signal at a reference clock frequency, and a subcarrier channel located at a subcarrier frequency;
- recovering the pilot tone, the reference clock signal, and the subcarrier channel from the information signal;
- generating a local oscillator from the pilot tone and the reference clock signal; and
- demodulating the subcarrier channel using the local oscillator, wherein phase noise contained in the local oscillator is correlated with phase noise contained in the subcarrier channel.

52. The method of claim 51 wherein the step of demodulating the subcarrier channel comprises:
- coherently demodulating the subcarrier channel.

53. The method of claim 51 wherein the step of recovering the pilot tone, the reference clock signal, and the subcarrier channel from the information signal comprises:
- matching a group delay for the pilot tone and for the subcarrier channel.

54. The method of claim 53 wherein the step of matching the group delay for the pilot tone and for the subcarrier channel comprises:
- matching a path length for the pilot tone and a path length for the subcarrier channel.

55. The method of claim 51 wherein the step of recovering the pilot tone, the reference clock signal, and the subcarrier channel from the information signal comprises:

recovering the reference clock signal substantially free from phase noise.

56. The method of claim 51 wherein the step of recovering the reference clock signal comprises:

incoherently demodulating the reference clock signal from the pilot tone.

57. The method of claim 51 wherein generating the local oscillator comprises:

frequency multiplying the reference clock signal by a fraction; and mixing the multiplied reference clock signal with the pilot tone to produce the local oscillator.

58. The method of claim 51 wherein generating the local oscillator comprises:

generating the local oscillator at a frequency equal to the subcarrier frequency.

59. The method of claim 51 wherein demodulating the subcarrier channel comprises:

substantially canceling the phase noise contained in the subcarrier channel with the phase noise contained in the local oscillator.

60. The method of claim 51 wherein:

the electrical information signal further comprises additional subcarrier channels located at unique subcarrier frequencies;

the step of recovering the pilot tone, the reference clock signal, and the subcarrier channel from the information signal further comprises recovering the additional subcarrier channels from the information signal;

the step of generating a local oscillator further includes generating a local oscillator for each additional subcarrier channel; and the step of demodulating the subcarrier channel further includes demodulating the additional subcarrier channels, wherein phase noise contained in each additional local oscillator is correlated with phase noise contained in the corresponding additional subcarrier channel.

61. The method of claim 60 wherein generating each additional local oscillator comprises:

frequency multiplying the reference clock signal by a fraction; and mixing the multiplied reference clock signal with the pilot tone to produce each additional local oscillator.

62. The method of claim 60 wherein generating each additional local oscillator comprises:

generating the local oscillator at a frequency equal to the subcarrier frequency of a corresponding additional subcarrier channel.

* * * * *